US007439866B2

(12) United States Patent
Wallner et al.

(10) Patent No.: US 7,439,866 B2
(45) Date of Patent: Oct. 21, 2008

(54) CHILD RESTRAINT SYSTEM COMPRISING EVENT DATA RECORDER, AND METHOD FOR PROVIDING DATA RELATING TO INSTALLATION OR ADJUSTMENT

(75) Inventors: Edward J Wallner, Westfield, IN (US); Kevin D. Kincaid, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 289 days.

(21) Appl. No.: 11/199,800

(22) Filed: Aug. 9, 2005

(65) Prior Publication Data

US 2006/0111821 A1    May 25, 2006

Related U.S. Application Data

(60) Provisional application No. 60/607,988, filed on Sep. 8, 2004, provisional application No. 60/600,094, filed on Aug. 9, 2004.

(51) Int. Cl.
*G08B 23/00* (2006.01)
(52) U.S. Cl. .................... 340/573.1; 340/667; 180/271; 180/273
(58) Field of Classification Search ............. 340/573.1, 340/666, 667, 457.1; 180/273, 271, 290; 200/85 A
See application file for complete search history.

(56) References Cited

U.S. PATENT DOCUMENTS

| 4,039,224 | A |   | 8/1977  | Bauer et al.      |
|-----------|---|---|---------|-------------------|
| 4,538,142 | A |   | 8/1985  | Hamilton et al.   |
| 5,174,035 | A |   | 12/1992 | Yamazaki          |
| 5,260,684 | A |   | 11/1993 | Metzmaker         |
| 5,454,591 | A |   | 10/1995 | Mazur et al.      |
| 5,581,234 | A |   | 12/1996 | Emery et al.      |
| 5,640,145 | A | * | 6/1997  | Newham ........... 340/667 |
| 5,656,994 | A |   | 8/1997  | Heninger          |
| 5,711,574 | A |   | 1/1998  | Barnes            |
| 5,720,519 | A |   | 2/1998  | Barnes            |
| 5,758,737 | A |   | 6/1998  | Brown et al.      |
| 5,790,031 | A | * | 8/1998  | Shelton et al. ........ 180/273 |
| 5,833,311 | A |   | 11/1998 | Friedrich et al.  |
| 5,965,827 | A |   | 10/1999 | Stanley et al.    |
| 5,980,335 | A |   | 11/1999 | Barbieri et al.   |
| 5,984,349 | A |   | 11/1999 | Van Voorhies      |
| 6,037,860 | A |   | 3/2000  | Zander et al.     |

(Continued)

FOREIGN PATENT DOCUMENTS

GB        2290505        1/1996

*Primary Examiner*—John Tweel, Jr.
(74) *Attorney, Agent, or Firm*—Douglas D. Fekete

(57) ABSTRACT

A child restraint system includes an electronic control unit having an event data recorder for storing data relating to proper adjustment or installation of the child restraint system. The control unit receives an electrical signal from one or more sensors mounted on the child seat and determines conditions of the child seat based upon the value of the property indicated by the signal. The event data recorder is configured to store the resulting data and to allow the stored data to be retrieved in response to an inquiry. Thus, in the event of a vehicle accident or other incident, the electronic control unit may be connected to an external diagnostic unit, and the relevant data may be downloaded to the diagnostic unit for evaluation.

23 Claims, 3 Drawing Sheets

U.S. PATENT DOCUMENTS

| | | | |
|---|---|---|---|
| 6,151,540 A | 11/2000 | Anishetty | |
| 6,203,059 B1 | 3/2001 | Mazur et al. | |
| 6,246,936 B1 | 6/2001 | Murphy et al. | |
| 6,255,790 B1 | 7/2001 | Popp et al. | |
| 6,259,042 B1 | 7/2001 | David | |
| 6,264,236 B1 | 7/2001 | Aoki | |
| 6,272,936 B1 | 8/2001 | Oreper et al. | |
| 6,356,187 B2 | 3/2002 | Jinno et al. | |
| 6,364,352 B1 | 4/2002 | Norton | |
| 6,371,516 B1 | 4/2002 | Miyagawa | |
| 6,382,667 B1 | 5/2002 | Aoki | |
| 6,438,476 B1 | 8/2002 | Gray et al. | |
| 6,459,973 B1 | 10/2002 | Breed et al. | |
| 6,463,372 B1 | 10/2002 | Yokota et al. | |
| 6,480,616 B1 | 11/2002 | Hata et al. | |
| 6,490,936 B1 | 12/2002 | Fortune et al. | |
| 6,502,860 B1 | 1/2003 | Siegfried et al. | |
| 6,517,106 B1 | 2/2003 | Stanley et al. | |
| 6,529,381 B1 | 3/2003 | Schoenfish | |
| 6,554,318 B2 | 4/2003 | Kohut et al. | |
| 6,578,871 B2 | 6/2003 | Gray et al. | |
| 6,587,770 B1 | 7/2003 | Gray et al. | |
| 6,595,545 B2 | 7/2003 | Curtis et al. | |
| 6,605,877 B1 | 8/2003 | Patterson et al. | |
| 6,608,567 B2 * | 8/2003 | Matsumoto | 180/271 |
| 6,643,575 B2 * | 11/2003 | Ishida et al. | 180/273 |
| 6,644,689 B2 | 11/2003 | Murphy | |
| 6,650,978 B1 | 11/2003 | Patterson et al. | |
| 6,662,094 B2 | 12/2003 | Murphy et al. | |
| 6,683,534 B2 | 1/2004 | Patterson et al. | |
| 6,749,038 B2 | 6/2004 | Sullivan et al. | |
| 6,796,192 B2 | 9/2004 | Sullivan et al. | |
| 6,812,844 B1 | 11/2004 | Burgess | |
| 6,818,842 B2 | 11/2004 | Gray et al. | |
| 6,847,302 B2 | 1/2005 | Flanagan et al. | |
| 6,850,825 B2 | 2/2005 | Murphy et al. | |
| 6,851,503 B2 | 2/2005 | Almaraz et al. | |
| 6,854,415 B2 | 2/2005 | Barnes et al. | |
| 6,863,286 B2 | 3/2005 | Eros et al. | |
| 6,868,745 B2 | 3/2005 | Sullivan et al. | |
| 6,889,146 B2 | 5/2005 | Sullivan et al. | |
| 6,958,451 B2 | 10/2005 | Breed et al. | |
| 7,004,541 B2 | 2/2006 | Sedlack | |
| 7,021,709 B2 | 4/2006 | Dolan et al. | |
| 7,029,068 B2 | 4/2006 | Yoshida et al. | |
| 7,055,639 B2 * | 6/2006 | Kiribayashi | 180/271 |
| 7,134,687 B2 | 11/2006 | Breed et al. | |
| 7,188,898 B2 | 3/2007 | Patterson | |
| 7,224,270 B2 | 5/2007 | Patterson | |
| 2004/0113634 A1 | 6/2004 | Stanley et al. | |
| 2004/0113797 A1 | 6/2004 | Osborne | |
| 2005/0026499 A1 | 2/2005 | Choi | |
| 2005/0030188 A1 | 2/2005 | Flannagan et al. | |
| 2005/0090959 A1 | 4/2005 | Winkler | |
| 2005/0092539 A1 | 5/2005 | Chitalia et al. | |
| 2005/0121956 A1 | 6/2005 | Dolan et al. | |
| 2005/0189805 A1 | 9/2005 | Burley et al. | |
| 2005/0194779 A1 | 9/2005 | Ito et al. | |
| 2005/0275258 A1 | 12/2005 | Patterson | |
| 2005/0275276 A1 | 12/2005 | Patterson | |
| 2005/0275554 A1 | 12/2005 | Patterson | |
| 2005/0278097 A1 | 12/2005 | Patterson | |
| 2005/0280297 A1 | 12/2005 | Patterson | |
| 2006/0057900 A1 | 3/2006 | Lawrence et al. | |

* cited by examiner

CHILD RESTRAINT SYSTEM COMPRISING EVENT DATA RECORDER, AND METHOD FOR PROVIDING DATA RELATING TO INSTALLATION OR ADJUSTMENT

CROSS REFERENCE TO RELATED APPLICATION

This application claims the benefits of U.S. Provisional Application No. 60/600,094, filed Aug. 9, 2004, and U.S. Provisional Application No. 60/607,988, filed Sep. 8, 2004, which are incorporated herein by reference.

This application is also related to the following United States Patent Applications, filed Jun. 6, 2005: CHILD RESTRAINT SYSTEM COMPRISING WEIGHT SENSOR, U.S. patent application Ser. No. 11/146,921, CHILD SEAT AND MONITORING SYSTEM, U.S. patent application Ser. No. 11/146,927; CHILD SEAT AND MONITORING SYSTEM, U.S. patent application Ser. No. 11/146,928, CHILD SEAT MONITORING SYSTEM AND METHOD FOR DETERMINING A TYPE OF CHILD SEAT, U.S. patent application Ser. No. 11/146,939; CHILD RESTRAINT SYSTEM AND METHOD FOR MONITORING INSTALLATION OF THE CHILD RESTRAINT SYSTEM, U.S. patent application Ser. No. 11/146,926; CHILD RESTRAINT SYSTEM AND METHOD FOR MONITORING INSTALLATION OF THE CHILD RESTRAINT SYSTEM, U.S. patent application Ser. No. 11/147,148; CHILD RESTRAINT SYSTEM COMPRISING CONTROL UNIT FOR EVALUATING HARNESS ADJUSTMENT, U.S. patent application Ser. No. 11/147,149. The contents of which are each incorporated herein by reference thereto.

TECHNICAL FIELD OF INVENTION

This invention relates to a child restraint system that includes one or more sensors coupled to a control unit for evaluating one or more conditions pertaining to the proper adjustment or installation of the child restraint system in an automotive vehicle. More particularly, this invention relates to such child restraint system wherein the control unit includes an event data recorder for recording data relating to such condition for retrieval in response to an inquiry, for example, following a vehicle accident or the like.

BACKGROUND OF INVENTION

A child restraint system, also referred to as a child car seat, is used for safely transporting a child within an automotive vehicle, so as to minimize the risk of injury to the child in the event of an accident. The design of the child restraint system is based upon the size of the child. A typical rear-facing infant seat is designed for an infant up to about 11 kilograms (about 25 pounds) and comprises a removable carrier that is coupled to a base securely installed in the vehicle. As the child grows, a forward-facing seat is recommended and is typically designed for a child between about 9 kilograms (about 20 pounds) and about 20 kilograms (about 45 pounds). A typical car seat for older children is a belt-positioning booster seat and may be designed for a child between about 18 kilograms (about 40 pounds) and about 45 kilograms (about 100 pounds).

To assist in the proper installation and adjustment of the child restraint system, it is proposed to equip the system with one or more sensors coupled to an electronic control unit. The sensors detect conditions to alert the adult operator if the child restraint system is not properly installed in the vehicle, or not adjusted properly for the child. The aforementioned related patent applications describe several sensors for measuring relevant conditions to determine that the child restraint system is properly installed and adjusted. For example, improper adjustment may be indicated by a weight sensor that alerts the adult operator when the child is not within the recommended weight range for the particular child seat. Also, sensors may also be provided to determine proper tension for tethers or belts that secure the child restraint system within the vehicle, and proper orientation and attitude of the child restraint system.

In the event an accident involving the vehicle transporting a child, data relating to the installation or adjustment of the child restraint system may be useful in assessing possible injury to the child. Therefore, a need exists for storing data relating to data relating to the installation or adjustment of the child restraint system and obtaining the data from the electronic control unit at a later time, for example, following a vehicle accident.

SUMMARY OF THE INVENTION

In accordance with a preferred embodiment of this invention, an electronic control unit for a child restraint system includes an event data recorder for storing data relating to proper adjustment or installation of the child restraint system. The child restraint system includes a child seat adapted to be installed in the vehicle and sized and shaped for receiving the child occupant. At least one sensor is associated with said child seat and senses a property useful in determining a condition of the child restraint system. As used herein, the condition refers to the manner in which the child restraint system is installed in the vehicle, or the manner in which the child restraint system is adjusted for the child, or other conditions relating to the proper use of the child restraint system, such as whether the child is within a recommended weight range. The sensor is electrically coupled to the electronic control unit and provides an electrical signal, the value of which is indicative of the property being sensed. The electronic control unit is configured to process the electrical signal and determine a status of the condition based upon the value of the electrical signal. The event data recorder is configured to store the resulting data and allow the stored data to be retrieved in response to an inquiry. The data may include the value of the electrical signal from the sensor, or the status determination by the electronic control unit, or both, and preferably also includes a time stamp. Thus, in the event of an accident or other incident, the data may be retrieved to assist in assessing possible injury to the child.

BRIEF DESCRIPTION OF DRAWINGS

This invention will be further described with reference to the accompanying drawings in which.

DETAILED DESCRIPTION OF INVENTION

Figure 1:
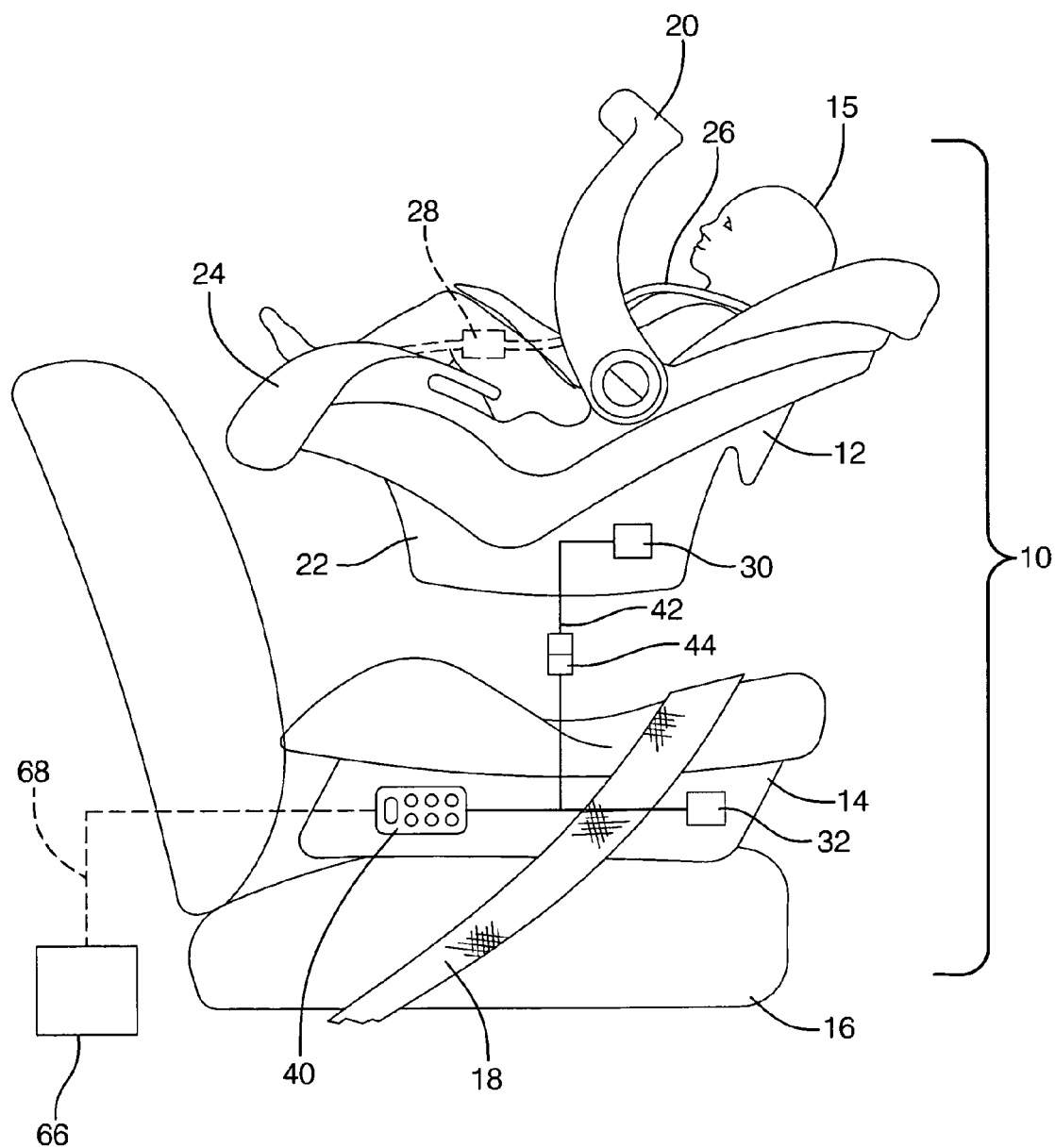
FIG. 1 is a plan view of a child restraint system in accordance with this invention.

In a preferred embodiment, referring to FIG. 1, a child restraint system in accordance with this invention is a rear-facing infant seat 10 that includes a carrier 12 and a base 14. Alternately, this invention may be suitably used in a forward-facing seat, a belt-positioning booster seat or other seat installable in a vehicle. In the illustrated embodiment, base 14 is installed in a rear seat 16 of a vehicle and secured by a vehicle seat belt 18 and optionally one or more additional tethers (not shown) that attach to the vehicle structure. The base is intended to remain in the vehicle for an extended period, typically until the child has outgrown the recommended size range for seat 10. Carrier 12 is adapted to accommodate a child 15 for transport both inside and outside the vehicle. Accordingly, carrier 12 securely couples to base 14 for transporting a child within the vehicle, but may be disengaged from base 14 for carrying the child outside the vehicle. A handle 20 is provided to facilitate transport outside the vehicle. A suitable infant seat comprising a carrier and a base is commercially available from Graco Children's Products, Inc. under the trade designation Snugride.

Carrier 12 comprises a shell 22 formed of a rigid polymeric material and defining a compartment sized and shaped for receiving child 15. The compartment is lined with a cushion 24 to enhance child comfort. Carrier 12 also includes a harness for restraining the child within the carrier. A suitable harness includes belts 26 coupled by a buckle 28.

In accordance with this invention, seat 10 is equipped with sensors 30, 32 for detecting or measuring one or more properties relating to the seat in the vehicle. For the rear-facing infant seat shown in FIG. 1, the sensors may include one or more sensors 30 mounted in carrier 12 and one or more sensors 32 mounted in base 14. The type of sensor depends upon the particular property to be measured, which in turn depends upon the condition of the child restraint system to be determined. In general, suitable sensors output an electrical signal having a value proportional to or indicative of the condition of the child restraint system. By way of preferred examples, the following are examples of sensors that may be used to evaluate or monitor conditions relating to proper installation or adjustment of the child restraint system:

1. An interlock sensor may be provided to determine that carrier 12 is properly engaged in base 14.
2. A sensor may be provided to determine that the child seat is facing in a proper direction relative to the front of the vehicle.
3. The weight of the child occupant may be determined and compared to a recommended weight range for the child restraint system. A preferred weight sensor is described in the aforementioned U.S. patent application Ser. No. 11/146,921, filed Jun. 6, 2005.
4. Sensors may be provided for evaluating proper adjustment of the harness by detecting the location of the belts within slots in the car seat structure. A preferred system with belt location sensors for this purpose is described in the aforementioned U.S. patent application Ser. No. 11/147,149, filed Jun. 6, 2005.
5. An evaluation of proper harness adjustment may include sensors that detect tension within the harness. A preferred system with a harness belt tension sensor is described in U.S. patent application Ser. No. 11/146,928, filed Jun. 6, 2005.
6. Sensors may be provided for determining that the harness is properly buckled.
7. For a child restraint system mounted in the vehicle using tethers, evaluation of proper installation may include determination of tension forces in the tethers. A preferred system comprising tethers and tension sensors is described in the aforementioned U.S. patent application Ser. No. 146,927, filed Jun. 6, 2005.
8. For a child restraint system that is secured by a vehicle seat belt, evaluation of proper installation may include determination of the force exerted by the vehicle seat belt. A preferred system comprising a sensor for measuring vehicle seat belt force is described in U.S. patent application Ser. No. 146,926, filed Jun. 6, 2005.
9. A sensor may be provided for determining proper angular orientation of the child seat relative to horizontal or vertical planes. A preferred system with sensors for this purpose is described in the aforementioned U.S. patent application Ser. No. 147,148, filed Jun. 6, 2005.

In accordance with this embodiment, the sensors are connected to a control module 40 through a wiring harness 42. Harness 42 may include a plug and socket connection 44 to allow the section of the harness in carrier 12 to be uncoupled from the section in base 14 for purposes of detaching the carrier to allow transport outside the vehicle. Alternately, sensors in the carrier may be coupled to one or more transmitters that transmit radio frequency signals, and control unit 40 may include a receiver for receiving the signals, to allow wireless communication therebetween. In the depicted embodiment, control module 40 is mounted in the base. Alternately, the control module may be mounted in the carrier and, if desired, coupled to sensors in the base.

Figure 2:
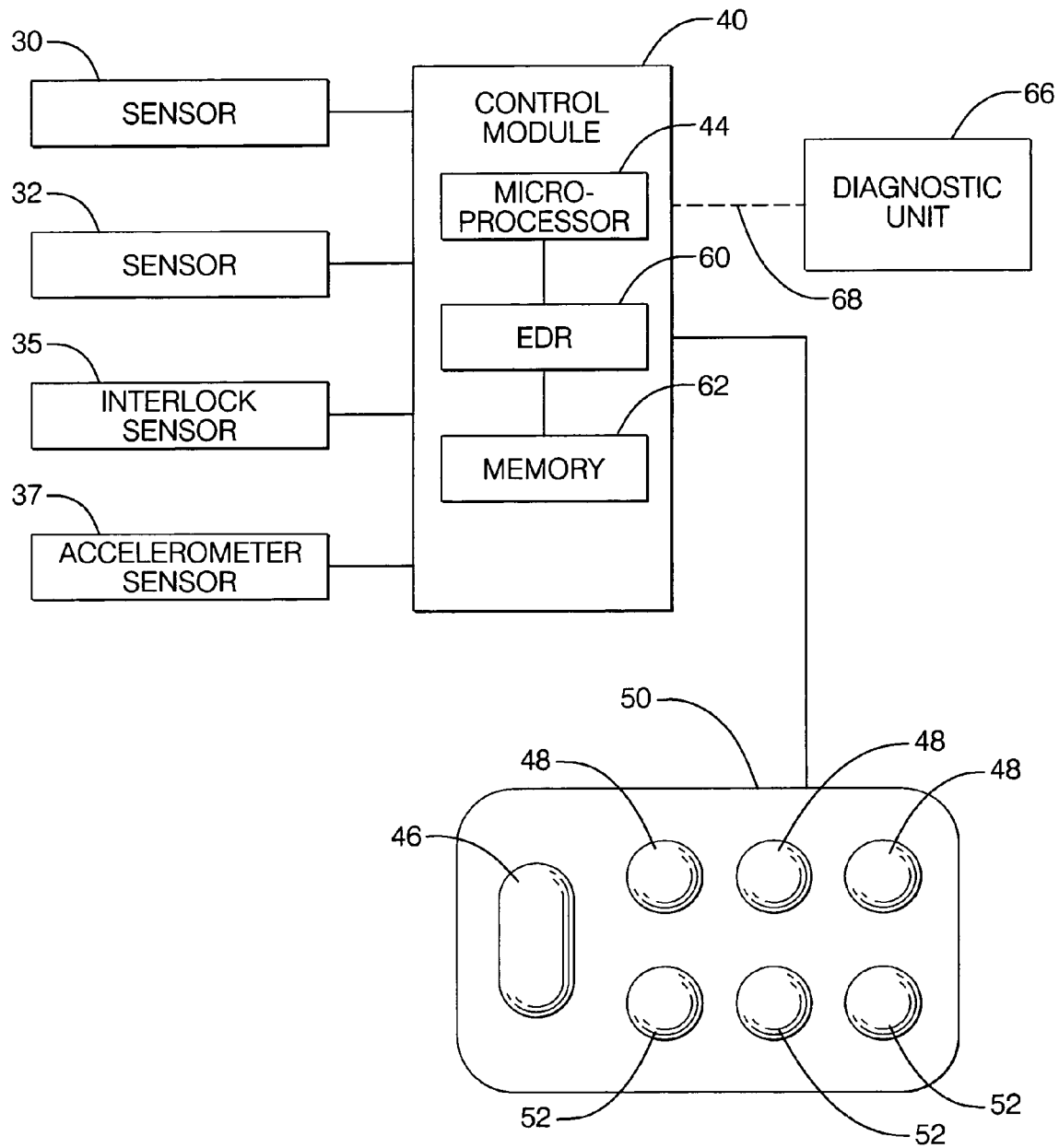
FIG. 2 is a schematic view of a electronic control unit of the child restraint system in FIG. 1.

Referring to FIG. 2, control module 40 receives the output signal from the sensor and includes a microprocessor 44 for processing the signal to determine the condition based upon the value of the signal. For example, when a child 15 is placed into carrier 12 and carrier 12 is assembled into base 14, the control module may initiate an evaluation of the child size based a sensor that provides a signal related to the weight of the child, and compare the child weight to the recommended weight range for seat 10. This may be in response to an operator pressing an activation button 46. Alternately, the microprocessor may be initiated in response to a signal from an interlock sensor 32 indicating that the carrier is assembled to the base.

Control module 40 also comprises a display 50 to alert the operator of the results of the determinations made thereby. In this embodiment, display 50 comprises a series of lights 48, 52, each representing a condition of seat 10. The lights include a series of lights 48, such as green lights, that confirm proper adjustment of seat 10, and a series of lights 52, such as red lights, that provide a warning of improper adjustment of the seat. By way of an example, display 50 includes a green light that confirms that the child weight is within the recommended range, and a red light 52 that alerts the operator that the child weight is greater than the recommended range. While in this embodiment the alert signal activates a light, the alert signal may activate an audible alert, such as a chime or buzzer, optionally in combination with the signal light. Alternately, the readable display, such as a liquid crystal display, may be used to provide a descriptive alert.

In accordance with this invention, control module 40 comprises an event data recorder 60 associated with a memory 62 and configured to store data relating to installation or adjustment of the car seat based upon the value of the signal or the status of the condition determined by the microprocessor. In a preferred embodiment, the microprocessor includes a program of computer instructions, and the EDR is a subroutine of the program carried out by the microprocessor. Alternately, EDR 60 may be a separate microprocessor coupled to primary microprocessor 44 and a discrete memory 62. The EDR preferably stores the data and a time stamp that indicates the date and time at which the data was obtained. Also, the EDR preferably stores the data from multiple recording events, each identified with appropriate time stamps, to allow review of the conditions over an extended period.

To retrieve the stored data, in accordance with the preferred embodiment, control module 40 is connected to an external diagnostic unit 66. A suitable diagnostic unit 66 is a portable computer that is connectable to the control module by a wire connection 68. For this purpose, module 40 may comprises a port adapted for making a wire connection, such as a USB port. Diagnostic unit 66 comprises a program that includes instructions to transmit an inquiry command in a protocol recognizable by EDR 60. In response to receipt of the inquiry, EDR downloads the stored data and associated time stamps to diagnostic unit 66. The operator of the diagnostic unit may then access the information for assessing the condition of the child seat 10 at the times indicated by the time stamps. Alternately, control module 40 may include a button, switch or other suitable input mechanism to cause the module to display stored condition using display 50, for example, the most recent conditions prior to a vehicle accident.

Figure 3:
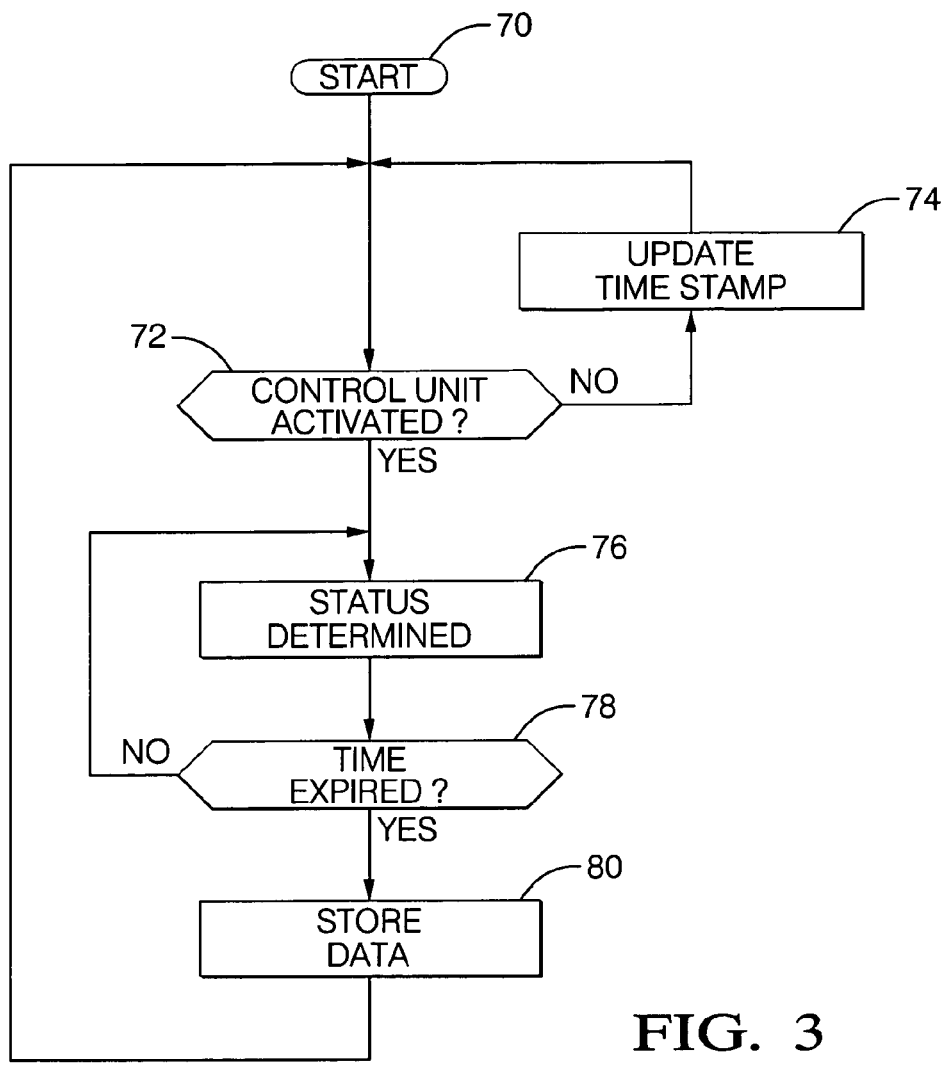
FIG. 3 is a flow diagram of a preferred method of storing data by an event data recorder in accordance with this invention.

A preferred mode of operation of EDR is described with reference to the flow diagram in FIG. 3. At step 70, the control module is turned on, for example, by a power supply or a switch.

At step 72, the EDR determines whether the control module has been activated. A preferred mode of activation is by an operator depressing activation button 46. Alternately, the control module may include a wake-up feature to periodically activate the control module to update sensor values and status determinations, thereby enabling the control module to alert the operator of changes in conditions. Also, for car seat 10 in FIG. 1, the car seat may include an interlock sensor 35 to detect attachment of carrier 12 into base 14, which may activate the control module. Also, sensors 30, 32 may include, an accelerometer 37 for detecting a significant force exerted on the car seat, such as a deceleration force indicative of a vehicle accident. The EDR may be activated in response to a signal from the accelerometer to store the data. In one alternative, it is desired to obtain and store the data at the onset of a deceleration incident, prior to alteration of the conditions of the child restraint system.

If the control module has not been activated, the EDR updates the time stamp at step 74. If control unit has been activated, step 76 determines whether the system has completed the evaluation routine and made the determinations of the conditions based upon the sensor inputs. Preferably, the program includes a time delay at step 78. The delay is provided to allow the operator to make adjustments to the car seat in response to the display to assure proper installation and conditions. Following the time delay, the EDR stores the data at step 80. The stored data preferably includes the values of signals from the sensors, the status for conditions determined by the control unit and the time stamp.

Figure 4:
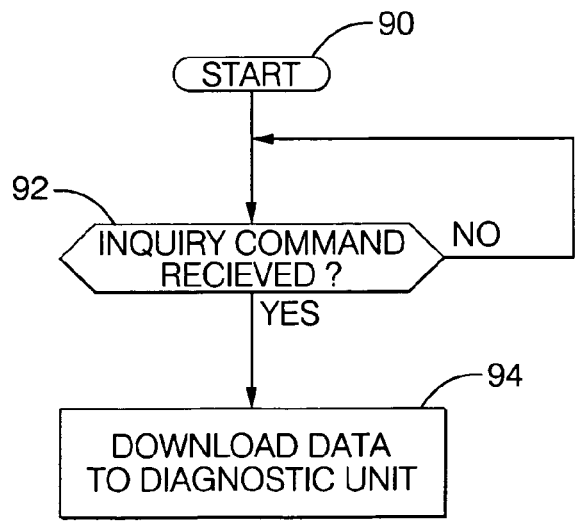
FIG. 4 is a flow diagram of a preferred method for retrieving data from the event data recorder.

Referring to FIG. 4, there is shown a flow diagram for downloading stored data to a diagnostic unit. At step 90, the diagnostic unit is connected to the control module, and the control module is activated. At step 92, the EDR receives an inquiry command. In response to the inquiry command, the EDR downloads the stored data at step 94.

Therefore, this invention provides a method for obtaining information about the condition of the child restraint system at particular times during transport of a child. Thus, following a vehicle accident, the control module may be connected to a diagnostic unit to retrieve the data for purposes of assessing the condition of the child restraint system during the accident. This information may be useful in evaluating possible injuries to the child. For example, the data, when downloaded, may reveal that the child restraint system was not properly installed and thus alert medical personnel of possible injuries to the child. Also, following numerous accidents, a database may be developed to show correlations between conditions and resulting child injuries to assist engineers in improving designs for child restraint systems.

In the described embodiment, the control module is actuated to store data relating to the condition of the child seat installed in an automotive vehicle. The control module may also be used to assess conditions when the child restraint system is installed in other types of vehicles. For a rear-facing infant seat of the type depicted in FIG. 1, this may include when the carrier is installed in a stroller or bicycle.

While this invention has been described in terms of the preferred embodiments thereof, it is not intended to be so limited, but rather only to the extent set forth in the claims that follow.

We claim:

1. A child restraint system for transporting a child occupant within a vehicle, said child restraint system comprising:
   a child seat adapted to be installed in the vehicle and sized and shaped for receiving the child occupant;
   a sensor associated with said child seat and providing an electrical signal having a value indicative of a condition relating to adjustment or installation of said child seat;
   an electronic control unit in electrical communication with said sensor for receiving said electrical signal and for determining a status of said condition based upon said value of said electrical signal, said electronic control unit comprising an event data recorder configured to store data relating to one of said value and said status and to retrieve said data in response to an inquiry.

2. A child restraint system in accordance with claim 1 wherein the electronic control unit further includes means for downloading the data to an external diagnostic unit.

3. A child restraint system in accordance with claim 1 wherein said electronic control unit further comprises means for connecting the electronic control unit to an external diagnostic unit and wherein the event data recorder is configured to receive an inquiry command from said diagnostic unit and to download said data to said diagnostic unit.

4. A child restraint system in accordance with claim 1 wherein said electronic control unit comprises an activation button, and wherein said event data recorder is configured to store said data in response to activation of said electronic control unit by said activation button.

5. A child restraint system in accordance with claim 4 wherein said event data recorder is configured to store said data following a predetermined time delay following activation of said electronic control unit using said activation button.

6. A child restraint system in accordance with claim 1 wherein said event data recorder is configured to store data periodically.

7. A child restraint system in accordance with claim 1 wherein the event data recorder is configured to store a time stamp associated with said data.

8. A child restraint system in accordance with claim 1 wherein the electronic control unit is configured to determine the presence of a child occupant based upon values of one or more electrical signals of one or more sensors, and wherein the event data recorder stores data in response to a determination indicative of the presence of a child occupant.

9. A child restraint system in accordance with claim 1 wherein the child restraint system includes an accelerometer for providing an output signal in response to a deceleration force indicative of a vehicle accident, and wherein said event data recorder is configured to store said data in response to said output signal.

10. A child restraint system in accordance with claim 1 wherein the electronic control unit comprises a microprocessor unit and a program of computer instructions for operating said microprocessor, and wherein the program includes the event data recorder.

11. A child restraint system in accordance with claim 1 wherein the child restraint system comprises one or more sensors selected from the group consisting of weight sensor adapted for determining weight of the child occupant, a sensor for determining the location, tension or proper buckling of a harness for restraining the child occupant within the child restraint system, a sensor of determining orientation or positional angle of the child restraint system within the vehicle, and a sensor for determining location or tension of a vehicle seat belt or tether securing the child restraint within the vehicle.

12. A child restraint system in accordance with claim 1 wherein the electronic control unit includes a display, and wherein the event data recorder comprises means for displaying stored data using said display.

13. A method for operating an electronic control unit of a child restraint system, said method comprising receiving an electrical signal form a sensor associated with said child restraint system, said electrical signal having a value;

determining a status of a condition relating to adjustment or installation of said child restraint system in a vehicle based upon said value of said electrical signal;

storing data relating to one of said value and said status;

receiving an inquiry, and retrieving said data in response to an inquiry.

14. A method in accordance with claim 13 wherein said electronic control unit comprises an event data recorder, and wherein said step of storing said data is carried out by said event data recorder.

15. A method in accordance with claim 13 wherein the step of retrieving said data comprises downloading said data to an external diagnostic unit.

16. A method in accordance with claim 13 wherein the step of receiving an inquiry comprises connecting said electronic control unit to an external diagnostic unit and receiving a command for said external diagnostic unit to download said data.

17. A method in accordance with claim 13 wherein said data is stored in response to activation of said electronic control unit using an activation button.

18. A method in accordance with claim 13 wherein said data is stored following a predetermined time after activation of said electronic control unit.

19. A method in accordance with claim 13 wherein said data is stored periodically.

20. A method in accordance with claim 13 further comprising storing a time stamp associated with said data.

21. A method in accordance with claim 13 wherein said data is stored in response to a determination by said electronic control unit that a child occupant is present in the child restraint system.

22. A method in accordance with claim 13 wherein said data is stored in response to a signal from an accelerometer associated with said child restraint system corresponding to a deceleration force indicative of a vehicle accident.

23. A method in accordance with claim 13 further comprising displaying the retrieved data in a display associated with the electronic control unit.

* * * * *